United States Patent
Gadhe et al.

(10) Patent No.: US 11,592,811 B2
(45) Date of Patent: Feb. 28, 2023

(54) METHODS AND APPARATUSES FOR DEFINING AUTHORIZATION RULES FOR PERIPHERAL DEVICES BASED ON PERIPHERAL DEVICE CATEGORIZATION

(71) Applicant: Honeywell International Inc., Charlotte, NC (US)

(72) Inventors: Ganesh Gadhe, Phoenix, AZ (US); Eric Knapp, Boston, MA (US); David Young, Stratham, NH (US); Doug Swain, Dover, NH (US); Virgil Mehalek, Dover, NH (US)

(73) Assignee: Honeywell International Inc., Charlotte, NC (US)

(*) Notice: Subject to any disclaimer, the term of this patent is extended or adjusted under 35 U.S.C. 154(b) by 220 days.

(21) Appl. No.: 17/038,763

(22) Filed: Sep. 30, 2020

(65) Prior Publication Data
US 2021/0103276 A1    Apr. 8, 2021

Related U.S. Application Data

(63) Continuation-in-part of application No. 16/590,793, filed on Oct. 2, 2019.

(51) Int. Cl.
| | | |
|---|---|---|
| *G06F 16/00* | (2019.01) | |
| *G05B 23/02* | (2006.01) | |
| *G06F 16/901* | (2019.01) | |
| *G05B 19/418* | (2006.01) | |
| *G06F 16/953* | (2019.01) | |

(52) U.S. Cl.
CPC ..... *G05B 23/0283* (2013.01); *G05B 19/4183* (2013.01); *G05B 19/41865* (2013.01); *G05B 19/41885* (2013.01); *G06F 16/9014* (2019.01); *G06F 16/953* (2019.01)

(58) Field of Classification Search
CPC ............ G05B 23/0283; G05B 19/4183; G05B 19/41865; G05B 19/41885; G06F 16/953; G06F 16/9014
See application file for complete search history.

(56) References Cited

U.S. PATENT DOCUMENTS

| | | | |
|---|---|---|---|
| 8,413,247 B2 | 4/2013 | Hudis et al. | |
| 2008/0229421 A1* | 9/2008 | Hudis | G06F 21/552 |
| | | | 726/25 |
| 2017/0351877 A1 | 12/2017 | Knapp et al. | |
| 2018/0046928 A1 | 2/2018 | Jang et al. | |
| 2018/0063181 A1* | 3/2018 | Jones | H04L 63/1433 |

FOREIGN PATENT DOCUMENTS

| | | |
|---|---|---|
| EP | 3180891 A1 | 6/2017 |
| WO | 2016/025226 A1 | 2/2016 |

OTHER PUBLICATIONS

European Search Opinion issued in European Application No. 20199955.4 dated Feb. 8, 2021, 3 pages.
European Search Report issued in European Application No. 20199955.4 dated Feb. 8, 2021, 2 pages.
Non-Final Office Action received for U.S. Appl. No. 16/590,793, dated Apr. 12, 2022, 12 pages.

* cited by examiner

*Primary Examiner* — Hung Q Pham
(74) *Attorney, Agent, or Firm* — Alston & Bird LLP

(57) ABSTRACT

Method, apparatus and computer program product for detecting vulnerability in an industrial control system, predicting maintenance in an industrial control system, and defining authorization rules for peripheral devices based on peripheral device categorization are described herein.

20 Claims, 9 Drawing Sheets

METHODS AND APPARATUSES FOR DEFINING AUTHORIZATION RULES FOR PERIPHERAL DEVICES BASED ON PERIPHERAL DEVICE CATEGORIZATION

CROSS REFERENCE TO RELATED APPLICATIONS

This application is a continuation-in-part of and claims priority to U.S. patent application Ser. No. 16/590,793, titled "METHODS AND APPARATUSES FOR VULNERABILITY DETECTION AND MAINTENANCE PREDICTION IN INDUSTRIAL CONTROL SYSTEMS USING HASH DATA ANALYTICS," and filed Oct. 2, 2019, the contents of which are hereby incorporated herein by reference in their entirety.

TECHNOLOGICAL FIELD

Embodiments of the invention relate, generally, to programmatically defining authorization rules for peripheral devices in an industrial control system.

BACKGROUND

In industrial control systems (ICS) and industrial internet of things (IIoT) environments, identification of vulnerable industrial computing product running in the computing environment has historically been difficult. In ICSs, resources for vulnerability analysis are often limited, for example, due to issues such as lack of Internet activity, interoperability issues, limitations on computing resources such as central processing unit (CPU), memory, input/output (I/O) constraints, or the like. Moreover, regular maintenance checkups that may address potential vulnerability in the ICSs are generally infrequent, at least in part because these maintenance checkups generally involve downtime that may lead to loss of productivity in the industrial production sites associated with the ICSs.

BRIEF DESCRIPTION OF THE DRAWINGS

Figure 1:
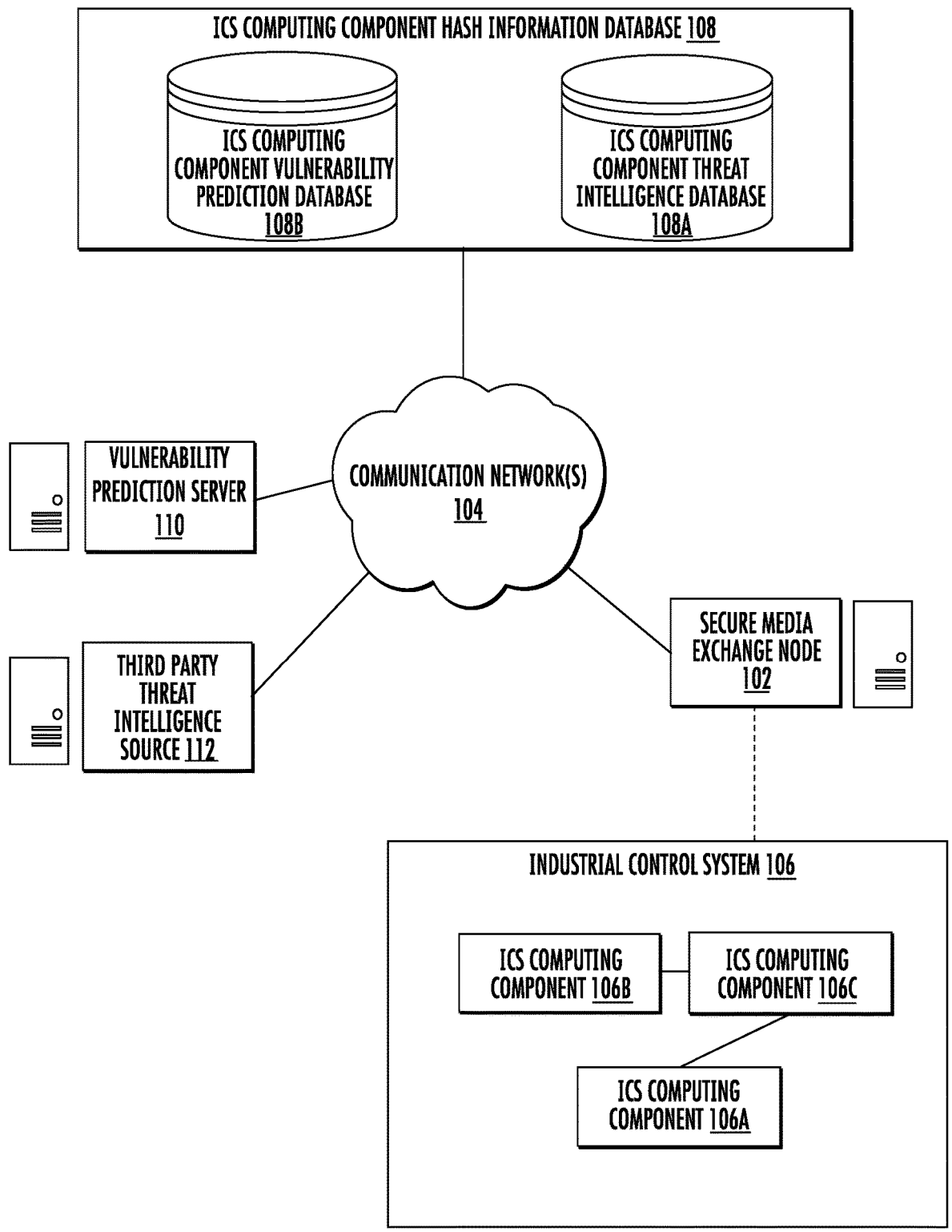
Figure 2:
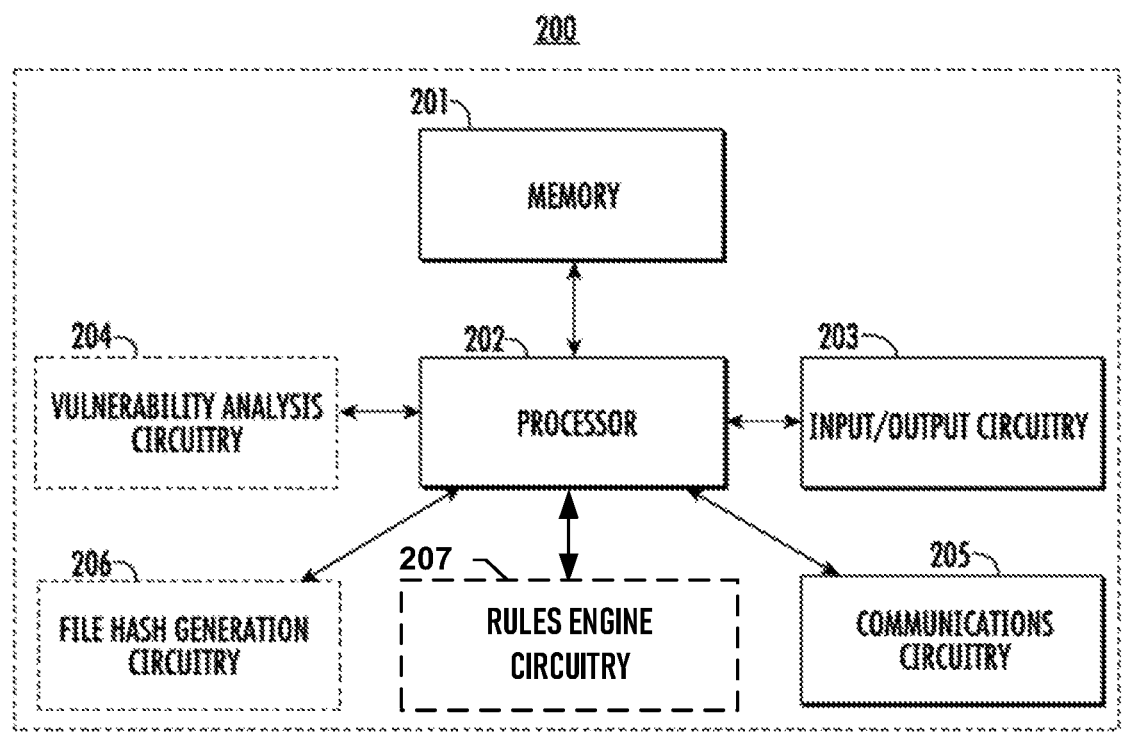
Figure 3:
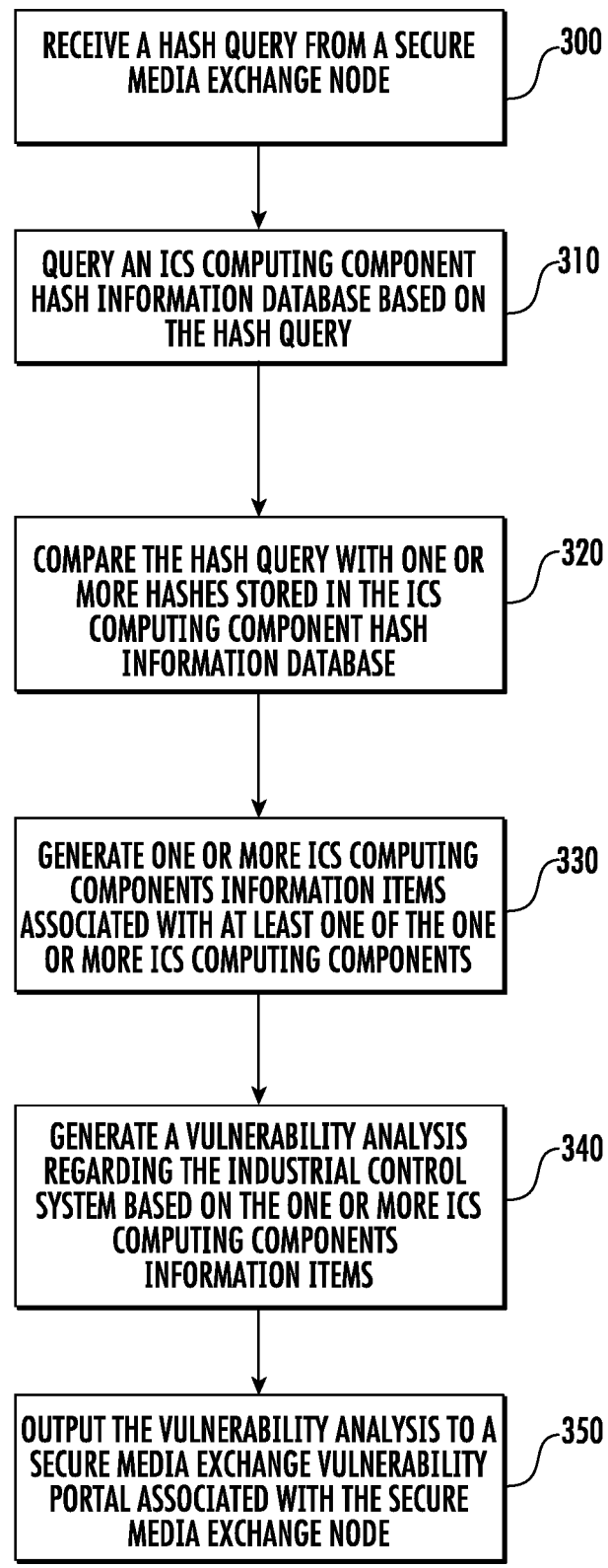
Figure 4A:
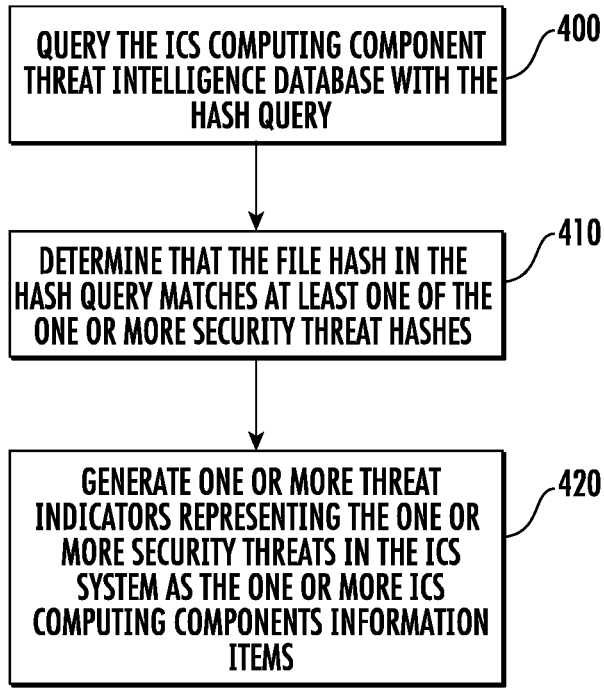
Figure 4B:
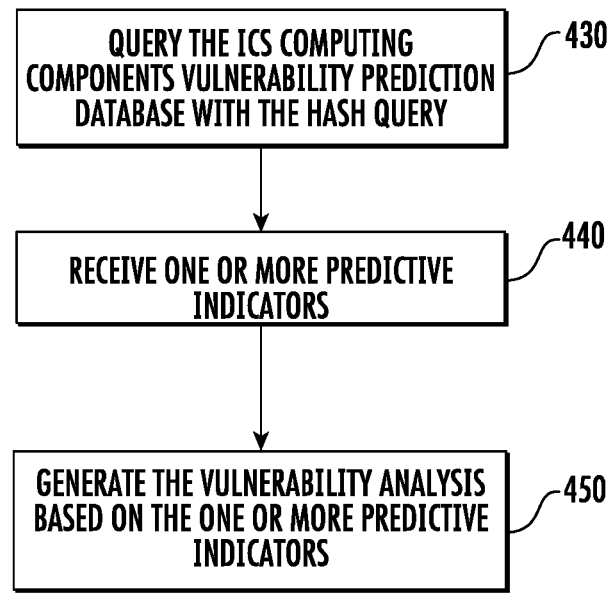
Figure 5:
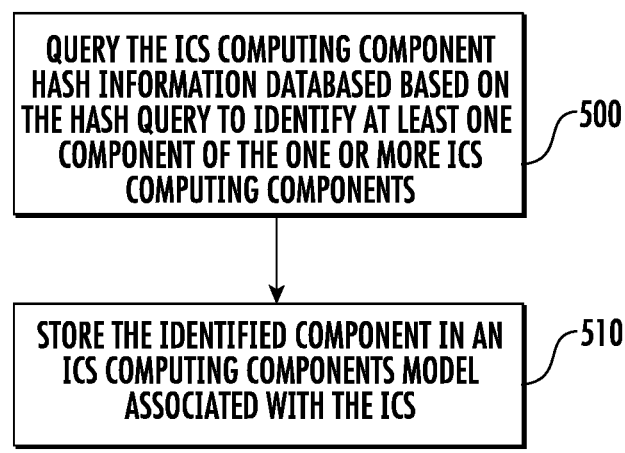
Figure 6:
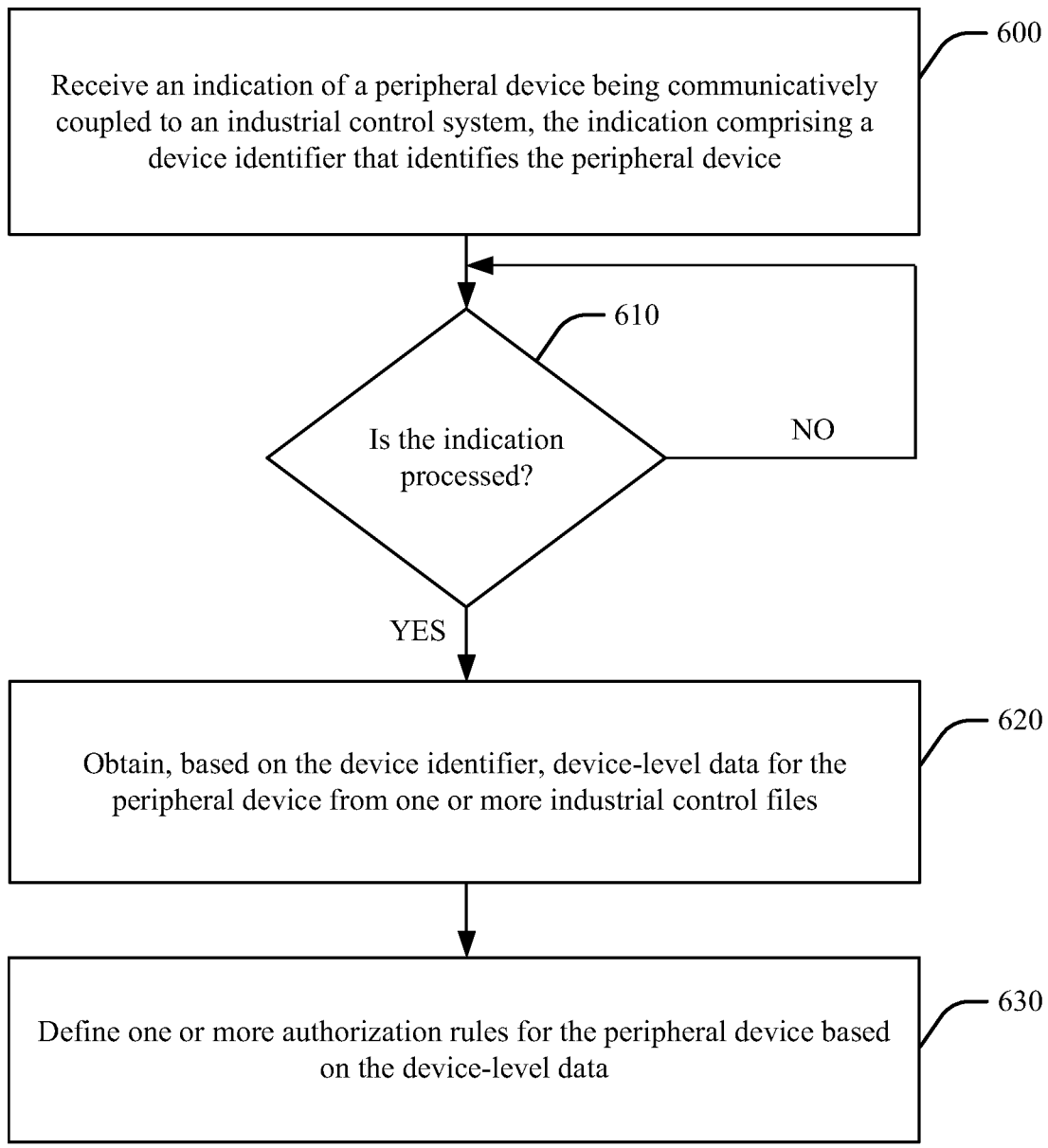
Figure 7:
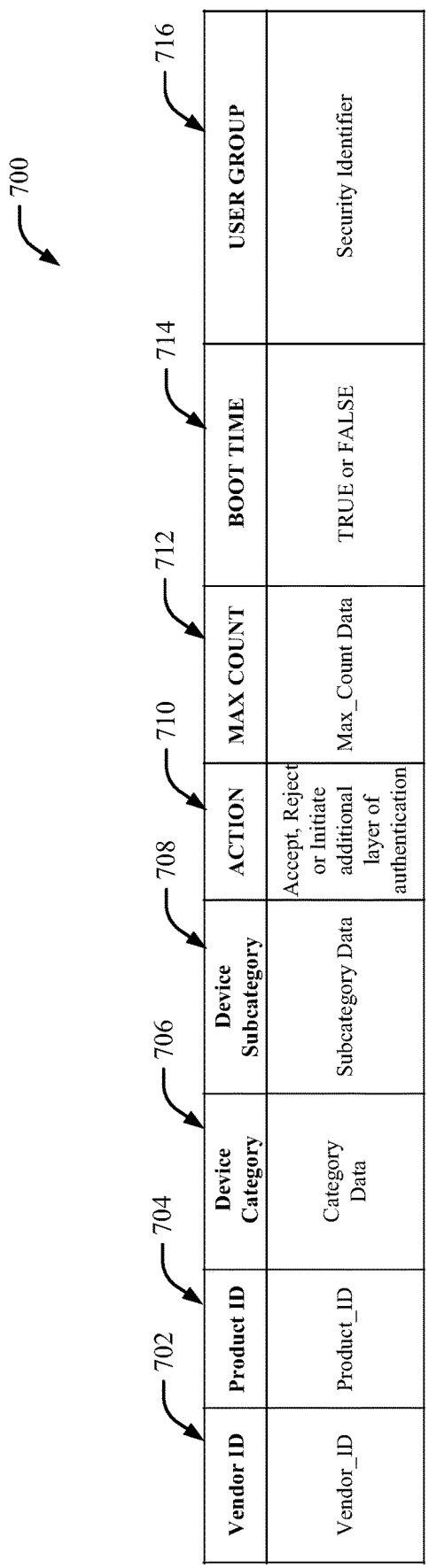
Figure 8:
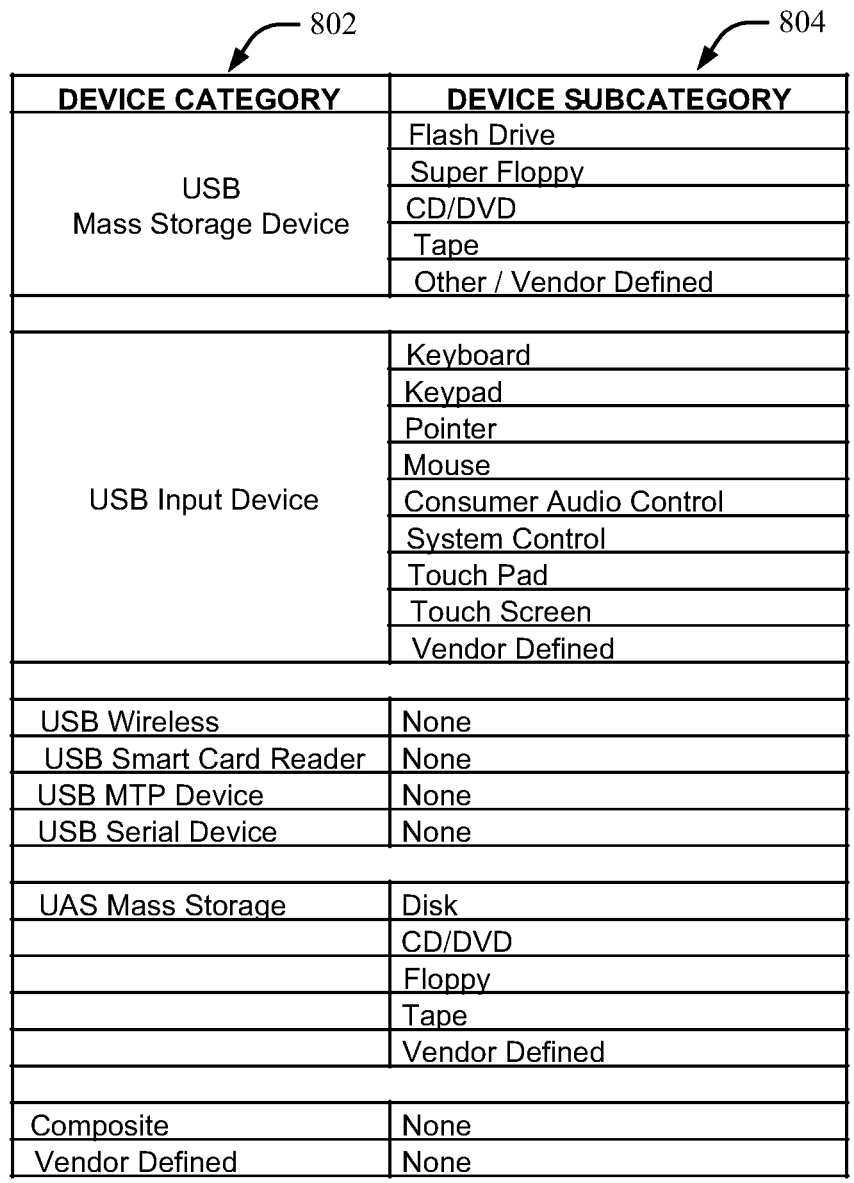
Figure 9:
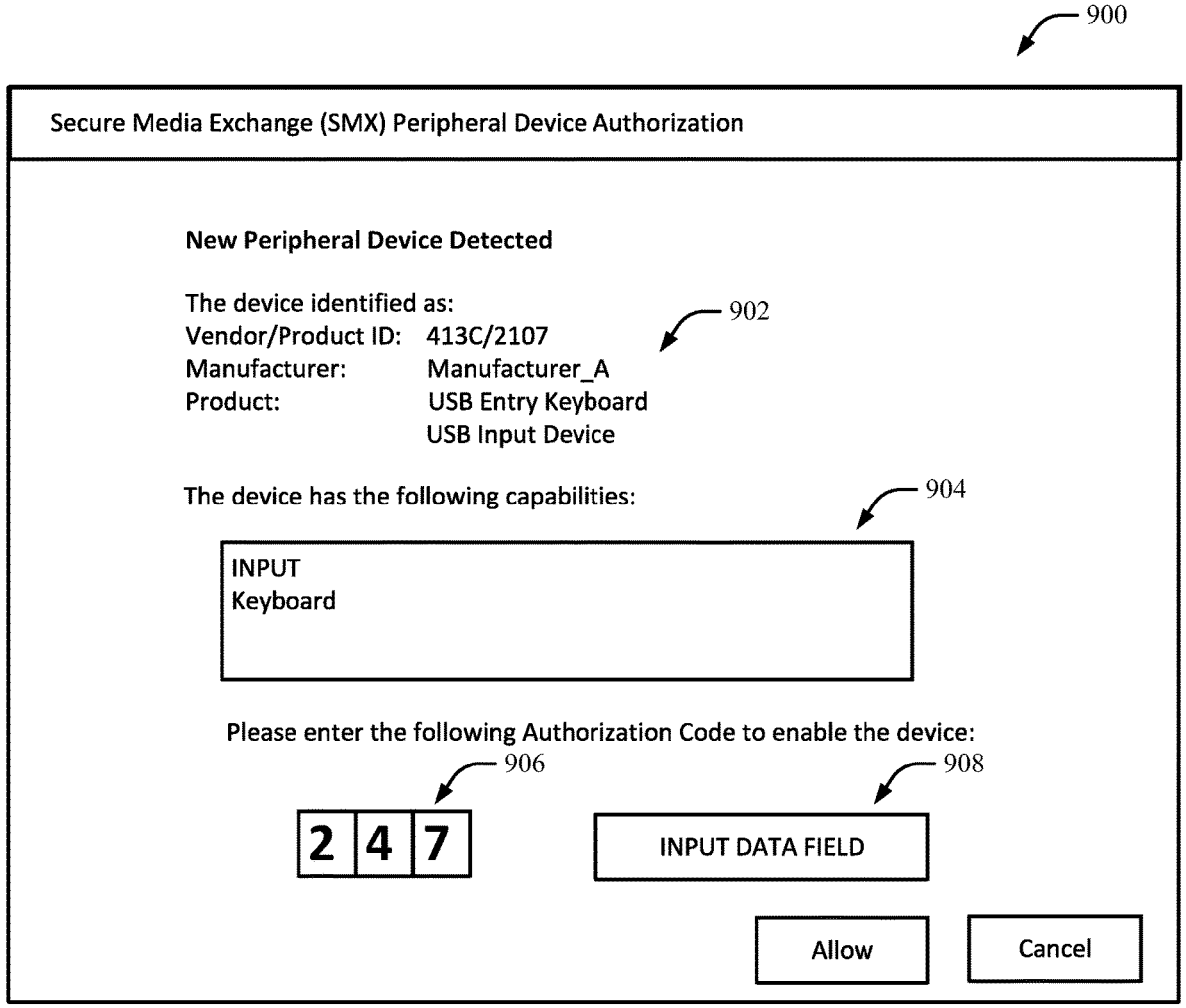

Having thus described the disclosure in general terms, reference will now be made to the accompanying drawings, which are not necessarily drawn to scale, and wherein:

FIG. 1 is a system architecture diagram of an embodiment of the present disclosure;

FIG. 2 is a schematic diagram of an exemplary computing entity according to one embodiment of the present disclosure;

FIG. 3 is a flowchart illustrating operations for detecting vulnerability and predicting maintenance in an industrial control system using hash analytics according to embodiments of the present disclosure;

FIGS. 4A and 4B are other flowcharts illustrating operations for detecting vulnerability and predicting maintenance in the industrial control system using hash analytics according to embodiments of the present disclosure;

FIG. 5 is another flowchart illustrating operations for programmatically building an ICS computing component model based on the one or more industrial files received according to embodiments of the present disclosure;

FIG. 6 is a flowchart illustrating operations for programmatically defining authorization rules for peripheral devices in an industrial control system according to embodiments of the present disclosure;

FIG. 7 illustrates exemplary device-level data according to embodiments of the present disclosure;

FIG. 8 illustrates exemplary device categorization data according to embodiments of the present disclosure; and FIG. 9 illustrates an exemplary notification according to embodiments of the present disclosure.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in one or more embodiments, or it can be excluded.

Enterprise systems often employ a private computing network that supports one or more types of access control and/or other cyber-security controls to limit network access. For instance, enterprise systems such as, but not limited to, industrial control systems, manufacturing plants, manufacturing facilities, hospitals, other healthcare facilities, classified network areas, etc. often employ access control and/or other cyber-security controls to limit access to the enterprise system. Additionally, it is often desirable to transfer information into and/or out of a secure network via removable media such as, for example, portable Universal Serial Bus (USB) drives. For example, removable media are often employed to move information or files (e.g., application patches, diagnostics applications, or documentation) into and/or out of a secure network associated with an enterprise system. However, removable media provide a path for cyber-attacks into protected systems. For example, in many instances, removable media represent one of the primary inbound paths through which viruses and other malware enter secure networks.

Additionally, in industrial environments, cyber security is of increasing concern and it is generally difficult to efficiently determine a potential source of risk to an industrial system associated with an industrial environment. Modern control systems generally contain peripheral devices such as, for example, a flash drive, a smart card, a USB serial device, a composite device, a vendor defined device field device, etc. Furthermore, peripheral devices are often a mixture of equipment from different vendors. As such, it is generally difficult to obtain a complete understanding or inventory of all equipment in an industrial system. Moreover, a device impersonation and/or an unaddressed security vulnerability with respect to a peripheral device may be exploited by external entity (e.g., an attacker, a hacker, etc.) to, for example, disrupt production or cause unsafe conditions in an industrial system. In certain scenarios, peripheral devices are modified and/or infected with a computer virus to introduce a threat to industrial systems when these peripheral devices are introduced into the industrial system. For example, peripheral devices with embedded firmware may have modified firmware and/or malicious computer code that is designed to produce aberrant or unexpected behavior for an industrial system.

Thus, to address these and/or other issues, methods and apparatuses for defining authorization rules for peripheral devices based on peripheral device categorization are provided. Various embodiments described herein relate to understanding peripheral device interfaces and/or characteristics. Various embodiments described herein additionally or alternatively relate to creating a database related to peripheral device knowledge and/or characteristics for peripheral devices. Various embodiments described herein additionally or alternatively relate to defining one or more authorization policies to, for example, allow a peripheral device to access an enterprise system, deny a peripheral device access to an enterprise system, consciously authorize a peripheral device to access an enterprise system based on an additional authorization process, etc. Various embodiments described herein relate to a rule creation mode associated with authorization of a peripheral device. Various embodiments described herein relate to a rule authentication mode associated with authorization of a peripheral device. Furthermore, various embodiments described herein define which users and/or groups are authorized to connect to different types of peripheral devices.

In an embodiment, a method for creating rules and/or policies for authentication of peripheral devices in an industrial control system based on characteristics and/or device categorization information for the peripheral devices is provided. According to various embodiments, an indication of a peripheral device being communicatively coupled to an industrial control system is received. In one or more embodiments, the indication includes a device identifier that identifies the peripheral device. According to various embodiments, in response to the indication, device-level data for the peripheral device is obtained from one or more industrial controls files. In one or more embodiments, the device-level data for the peripheral device is obtained based on the device identifier. According to various embodiments, in response to the indication, one or more authorization rules are defined for the peripheral device based on the device-level data.

In one or more embodiments, the defining the one or more authorization rules includes defining the one or more authorization rules based on device categorization data included in the device-level data. In one or more embodiments, the defining the one or more authorization rules includes defining the one or more authorization rules based on based on different modes of the industrial control system.

In one or more embodiments, the method includes creating a rule database hash file with the device-level data and the one or more authorization rules. In one or more embodiments, the method includes storing the rule database hash file in a database for a secure media exchange platform associated with the industrial control system.

In one or more embodiments, the method includes querying the peripheral device to obtain device categorization data for the peripheral device. In one or more embodiments, the method includes obtaining the device-level data from a simulation performed with respect to system operations system for the industrial control system.

In one or more embodiments, in response to receiving another indication of the peripheral device being communicatively coupled to the industrial control system, the method includes initiating a rule authentication mode to determine whether to authorize the peripheral device to access the industrial control system.

In one or more embodiments, in response to receiving another indication of the peripheral device being communicatively coupled to the industrial control system, the method includes generating a notification for additional layer of authentication provided by a user.

In another embodiment, a method for detecting vulnerability in an industrial control system is provided. The method includes receiving a hash query from a secure media exchange node. The hash query includes a file hash generated at the secure media exchange node based at least in part on one or more industrial control files received at the secure media exchange node and associated with at least one of one or more ICS computing components in an industrial control system (ICS). The method further includes querying an ICS computing component hash information database based on the hash query to generate one or more ICS computing component information items associated with at least one of the one or more ICS computing components by comparing the hash query with one or more hashes stored in the ICS computing component hash information database. The method further includes generating a vulnerability analysis regarding the industrial control system based on the one or more ICS computing component information items. The method further includes outputting the vulnerability analysis to a secure media exchange vulnerability portal associated with the secure media exchange node.

In one or more embodiments, the ICS computing component hash information database includes an ICS computing component threat intelligence database configured to store at least one or more security threat hashes representing one or more security threats associated with one or more industrial control files. In one or more embodiments, the method further includes: querying the ICS computing component threat intelligence database with the hash query; and upon determining that the file hash in the hash query matches at least one of the one or more security threat hashes, generating one or more threat indicators representing the one or more security threats in the ICS system as the one or more ICS computing component information items.

In one or more embodiments, the one or more security threats are each associated with one of the one or more ICS computing components. In one or more embodiments, the one or more security threats are one or more of: one or more known security vulnerabilities, one or more viruses, or one or more trojans.

In one or more embodiments, the ICS computing component hash information database comprises an ICS computing component vulnerability prediction database configured to store one or more hashes associated with one or more industrial control files. In one or more embodiments, the method further includes: querying the ICS computing components vulnerability prediction database with the hash query; receiving one or more predictive indicators, each of the one or more predictive indicators are associated with at least one of the one or more components; and generating the vulnerability analysis based on the one or more predictive indicators. In one or more embodiments, the one or more predictive indicators include one or more of: a version number associated with at least one of the one or more industrial control files, an updated timestamp associated with at least one of the one or more industrial control files, or an outdated file flag representing that one or more files associated with at least one of the one or more industrial control files is not in the one or more industrial control files.

In one or more embodiments, the secure media exchange vulnerability portal is a web-based portal installed on the secure media exchange node.

In one or more embodiments, the secure media exchange vulnerability portal is associated with the ICS computing component hash information database.

In one or more embodiments, the one or more ICS computing components do not have access to the world wide web while the ICS is in operation.

In one or more embodiments, the method further includes querying the ICS computing component hash information database based on the hash query to identify at least one component of the one or more ICS computing components and storing the identified component in an ICS computing components model associated with the ICS.

In another embodiment, an apparatus configured to programmatically detect vulnerability in an industrial control system is provided. The apparatus comprising at least a processor, and a memory associated with the processor having computer coded instructions therein, with the computer coded instructions configured to, when executed by the processor, cause the apparatus to receive a hash query from a secure media exchange node. The hash query comprises a file hash generated at the secure media exchange node based at least in part on one or more industrial control files received at the secure media exchange node and associated with at least one of one or more ICS computing components in an industrial control system (ICS).

In one or more embodiments, the computer coded instructions are further configured to, when executed by the processor, cause the apparatus to query an ICS computing component hash information database based on the hash query to generate one or more ICS computing component information items associated with at least one of the one or more ICS computing components by comparing the hash query with one or more hashes stored in the ICS computing component hash information database.

In one or more embodiments, the computer coded instructions are further configured to, when executed by the processor, cause the apparatus to generate a vulnerability analysis regarding the industrial control system based on the one or more ICS computing component information items.

In one or more embodiments, the computer coded instructions are further configured to, when executed by the processor, cause the apparatus to output the vulnerability analysis to a secure media exchange vulnerability portal associated with the secure media exchange node.

In one or more embodiments, the ICS computing component hash information database comprises an ICS computing component threat intelligence database configured to store at least one or more security threat hashes representing one or more security threats associated with one or more industrial control files. In one or more embodiments, the computer coded instructions are further configured to, when executed by the processor, cause the apparatus to: query the ICS computing component threat intelligence database with the hash query; and upon determining that the file hash in the hash query matches at least one of the one or more security threat hashes, generate one or more threat indicators representing the one or more security threats in the ICS system as the one or more ICS computing component information items.

In one or more embodiments, the one or more security threats are each associated with one of the one or more ICS computing components.

In one or more embodiments, the one or more security threats are one or more of: one or more known security vulnerabilities, one or more viruses, or one or more trojans.

In one or more embodiments, the ICS computing component hash information database comprises an ICS computing component vulnerability prediction database configured to store one or more hashes associated with one or more industrial control files. In one or more embodiments, the computer coded instructions are further configured to, when executed by the processor, cause the apparatus to: query the ICS computing components vulnerability prediction database with the hash query; receive one or more predictive indicators, wherein each of the one or more predictive indicators are associated with at least one of the one or more components; and generate the vulnerability analysis based on the one or more predictive indicators.

In one or more embodiments, the one or more predictive indicators include one or more of: a version number associated with at least one of the one or more industrial control files, an update timestamp associated with at least one of the one or more industrial control files, or an outdated file flag representing that one or more files associated with at least one of the one or more industrial control files is not in the one or more industrial control files.

In one or more embodiments, the secure media exchange vulnerability portal is a web-based portal installed on the secure media exchange node. In one or more embodiments, the secure media exchange vulnerability portal is associated with the ICS computing component hash information database. In one or more embodiments, the one or more ICS computing components do not have access to the world wide web while the ICS is in operation.

In one or more embodiments, the computer coded instructions are further configured to, when executed by the processor, cause the apparatus to query the ICS computing component hash information database based on the hash query to identify at least one component of the one or more ICS computing components and store the identified component in an ICS computing components model associated with the ICS.

As such, by employing one or more techniques disclosed herein, performance of an industrial control system is improved. Security for an industrial control system is additionally or alternatively improved by employing one or more techniques disclosed herein. Moreover, a number of computing resources, a number of a storage requirements, and/or number of errors associated with authorization of a peripheral device with respect to an industrial control system is reduced by employing one or more techniques disclosed herein.

The term "circuitry" should be understood broadly to include hardware and, in one or more embodiments, software for configuring the hardware. With respect to components of the apparatus, the term "circuitry" as used herein should therefore be understood to include particular hardware configured to perform the functions associated with the particular circuitry as described herein. For example, in one or more embodiments, "circuitry" includes processing circuitry, storage media, network interfaces, input/output devices, and the like.

As used herein, the terms "data," "content," "digital content," "digital content object," "information," and similar terms is used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data is received directly from another computing device or indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data is sent directly to another computing device or is sent indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which is differentiated from a "computer-readable transmission medium," which refers to an electromagnetic signal.

The term "industrial control system" (ICS) refers to a computing system that includes one or more industrial control system computing components that each are connected to a device or machinery in an industrial system. For example, in one or more embodiments, an ICS is a supervisory control and data acquisition system that includes several programmable logic controllers distributed in various locations that provide long distance monitoring and control of field sites through a centralized control system. In one or more embodiments, an ICS is a distributed control system that is configured to control various ICS computing components that take the form of operational technology hardware and software systems. In one or more embodiments, the ICS computing components that take the form of operational technology hardware and software systems is configured as various controllers that control an industrial production process.

The term "ICS computing component" refers to computing hardware and software system in an ICS. For example, in one or more embodiments, the ICS computing component is configured as operational technology hardware and software systems that monitors or controls physical devices in the industrial control system. Example physical devices include manufacturing equipment, monitoring equipment such as storage or device monitoring equipment, manufacturing material moving equipment, or other equipment used in an industrial production site. In one or more embodiments, the ICS computing component is configured as a programmable logic controller that provides local management of processes being run through feedback devices such as sensors and actuators. In one or more embodiments, the ICS computing component is configured as a master terminal unit in a supervisory control and data acquisition system that is configured to transmit commands to or receive information from one or more remote terminal units, a remote terminal unit, a human machine interface, a control server, intelligent electronic devices that is associated with another physical device in the industrial system, or the like.

The term "industrial control files" refers to files generated by, transmitted to, or to be transmitted to an ICS computing component. Example industrial control files include, by way of example, industrial control system drivers in an ICS, process information in an ICS, command data, data generated by a master terminal unit or a remote terminal unit, data generated by a control server, data generated by sensors and actuators, data generated by intelligent electronic devices that is associated with physical device in the industrial system, metadata associated with generation or transmission of data of ICS computing components. In one or more embodiments, an industrial control file includes one or more information items that is designated as predictive indicators for determining whether the ICS computing component that the industrial control file is generated from or being transmitted to is potentially vulnerable.

The term "secure media exchange node" refers to computer hardware and/or software configured to receive one or more industrial control files and generate a file hash of the one or more industrial control files. In one or more embodiments, the one or more industrial control files are stored on the secure media exchange node. In one or more embodiments, the one or more industrial control files are stored on a memory or data store communicatively coupled to the secure media exchange node. In one or more embodiments, the one or more industrial control files are stored on a peripheral device such as, for example, a plug and play portable storage device. For example, in one or more embodiments, the one or more industrial control files are stored on a universal serial bus (USB) based storage device, or other physical, portable storage device, such as flash-based storage, memory-card based storage, and/or the like to be connected to an ICS computing component associated with the one or more industrial control files. For example, in an embodiment, the USB based storage device is connected to the secure media exchange node before the USB based storage device is connected to the ICS computing component to transmit the one or more industrial control files to the ICS computing component. In one or more embodiments, the USB based storage device stores one or more industrial control files generated by the ICS computing component and transmits the one or more industrial control files to the secure media exchange node via a USB. In one or more embodiments, the secure media exchange node is a device physically located within an industrial production site that the ICS operates in.

The term "vulnerability analysis" refers to a file or data structure representing one or more vulnerabilities or potential vulnerabilities that are present in one or more ICS computing components. For example, in one or more embodiments, a vulnerability analysis includes data representative of one or more known security threats and/or a data indicating that one or more ICS computing components are potentially vulnerable and requires maintenance.

The term "ICS computing component information item" refers to data generated by or received by a vulnerability server regarding one or more ICS computing components based on file hashes received from a secure media exchange node. In one or more embodiments, example ICS computing component information items include threat indicators representing one or more known security threats, predictive indicators representing potential security vulnerabilities that take the form of a version number associated with at least one of the one or more industrial control files, an update timestamp associated with at least one of the one or more industrial control files, or an outdated file flag representing that one or more files associated with at least one of the one or more industrial control files is not in the one or more industrial control files.

The term "threat indicator" refers to a data structure generated by a vulnerability server based on matching of file hashes received from a secure media exchange node and a file hash stored in an ICS computing component hash information database that represents a potential security threat in an ICS associated with the secure media exchange node.

The term "predictive indicator" refers to a data structure for predicting potential vulnerabilities associated with an industrial file. In one or more embodiments, a predictive indicator is stored along with a file hash of the industrial file. In one or more embodiments, a predictive indicator includes, by way of example, one or more of: a version number associated with at least one of the one or more industrial control files, an update timestamp associated with at least one of the one or more industrial control files, an outdated file flag representing that one or more files associated with at least one of the one or more industrial control files is not in the one or more industrial control files, or another form of indicator associated with the one or more file hashes.

The term "secure media exchange vulnerability portal" refers to an interface configured to render data included in a vulnerability analysis. For example, in one or more embodiments, the secure media exchange vulnerability portal is configured as a web-based portal that is accessible to one or more computing entities. In one or more embodiments, the secure media exchange vulnerability portal is rendered on the secure media exchange node. In one or more embodiments, the secure media exchange vulnerability portal is rendered on another device.

Example System Architecture

Methods, apparatuses, and computer program products of the present disclosure are embodied by any of a variety of devices. For example, the method, apparatus, and computer program product of an example embodiment is embodied by a networked device (e.g., an enterprise platform), such as a server or other network entity, configured to communicate with one or more devices, such as one or more secure media exchange nodes. Additionally or alternatively, in one or more embodiments, the computing device includes fixed computing devices, such as a personal computer, a tablet, or a computer workstation. Still further, example embodiments are embodied by any of a variety of mobile devices, such as a portable digital assistant (PDA), mobile telephone, smartphone, laptop computer, tablet computer, wearable, or any combination of the aforementioned devices. Additionally or alternatively, in one or more embodiments, the computing device includes programmable logic controllers, microcontrollers, intelligent electronic devices that is associated with physical device in the industrial system, or other computing device that may be used to embody ICS computing components.

FIG. 1 illustrates a system architecture diagram of one or more embodiments of the present disclosure.

In one or more embodiments, a secure media exchange node 102 is embodied as a computer, a tablet computer, or the like. The secure media exchange node 102 is configured to receive industrial control files generated from an industrial control system 106 or receive industrial control files to be transmitted to the industrial control system 106. In one or more embodiments, an ICS 106 includes one or more ICS computing components 106A to 106C. In one or more embodiments, the ICS 106 is a computing system that is not connected to a communication network 104, or any communication network that is connected to the Internet. In one or more embodiments, the one or more industrial control files are stored on a peripheral device (e.g., a portable storage device), such as a USB based storage device to be connected to an ICS computing component associated with the one or more industrial control files. For example, in one or more embodiments, the USB based storage device is connected to the secure media exchange node before the USB based storage device is connected to the ICS computing component to transmit the one or more industrial control files to the ICS computing component. In one or more embodiments, the USB based storage device stores one or more industrial control files generated by the ICS computing component and transmits the one or more industrial control files to the secure media exchange node via a USB.

In one or more embodiments, the secure media exchange node 102 communicates with, via the communication network 104, a vulnerability prediction server 110. In one or more embodiments, the secure media exchange node 102 transmits one or more hashes of the one or more industrial control files to the vulnerability connection server 110 via the communication network 104. In one or more embodiments, the secure media exchange node 102 is a device physically located within an industrial production site that the ICS operates in. In one or more embodiments, the secure media exchange node 102 is embodied as a computer or computers. In one or more embodiments, the secure media exchange node 102 is not directly connected to the ICS 106 via any form of connection network. In such embodiments, the secure media exchange node 102 receives the one or more industrial control files via the USB based storage device.

The vulnerability prediction server 110 queries an ICS computing component hash information database 108 with a file hash received from the secure media exchange node 102. In one or more embodiments, the vulnerability prediction server 110 is embodied as a computer or computers. In one or more embodiments, the vulnerability prediction server 110 provides for receiving of electronic data from various sources, including but not necessarily limited to the secure media exchange node 102. For example, in one or more embodiments, the vulnerability prediction server 110 is configured to transmit and receive file hashes to or from the secure media exchange node 102. In one or more embodiments, the vulnerability prediction server 110 is in communication with the ICS computing component hash information database 108 through the communication network 104.

In one or more embodiments, the ICS computing component hash information database 108 includes one or more databases, such as an ICS computing component threat intelligence database 108A and/or an ICS computing component vulnerability prediction database 108B. In one or more embodiments, the ICS computing component hash information database 108 stores one or more file hashes. In one or more embodiments, the one or more file hashes are identified, in the ICS computing component hash information database 108, as a safe file hash or a security threat hash. In one or more embodiments, the one or more file hashes are additionally or alternatively associated with one or more ICS computing component identifiers, one or more predictive indicators, one or more threat indicators, or the like.

According to one or more embodiments, communications network 104 includes any wired or wireless communication network including, for example, a wired or wireless Personal Area Network (PAN), Local Area Network (LAN), Metropolitan Area Network (MAN), Wide Area Network (WAN), and/or the like. For example, in various embodiments, the one or more communication networks 104 described herein are configured to use any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, wireless universal serial bus (USB) protocols, and/or any other wireless protocol.

According to one or more embodiments, the ICS computing component hash information database 108 is embodied as a data storage device such as a Network Attached Storage (NAS) device or devices, or as a separate database server or servers. The ICS computing component hash information database 108 includes file hashes of one or more industrial files and data associated with the file hashes. For example, in one or more embodiments, the ICS computing component hash information database 108 includes, without limitation, outdated file flags associated with the file hashes, updated timestamps associated with the file hashes, version numbers associated with the file hashes, predictive indicators associated with the file hashes, threat indicators associated with the file hashes, or the like. In one or more embodiments, the ICS computing component hash information database 108 includes an ICS computing component threat intelligence database 108A and/or an ICS computing component vulnerability prediction database 108B. In one or more embodiments, the ICS computing component vulnerability prediction database 108B includes one or more security threat hashes which are file hashes for industrial control files with known security threats. In one or more embodiments, the ICS computing component vulnerability prediction database 108B includes one or more predictive indicators associated with one or more file hashes. In one or more embodiments, the predictive indicators include one or more of a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, and/or another form of indicator associated with the one or more file hashes.

In one or more embodiments, the ICS computing component hash information database 108 is periodically updated by communicating, via the communication network 104, with a third-party threat intelligence source 112. In one or more embodiments, the third-party threat intelligence source 112 is embodied as a separate database server or servers managed by an entity that is different from the entity managing the secure media exchange node 102. In one or more embodiments, the ICS computing component hash information database 108 stores one or more ICS system models that include information regarding one or more ICS computing components and association between different models of ICS computing components. For example, in an embodiment, an ICS system model indicates that an ICS computing component with a model number of 89114 by manufacturer ACME is determined to be associated with one or more ICS computing components of different model numbers by manufacturer ACME or a different manufacturer. In one or more embodiments, the ICS system models stored in the ICS computing component hash information database 108 are updated periodically.

In one or more embodiments, the ICS computing component hash information database 108 is in communication with the vulnerability prediction server 110 through the communication network 104. In one or more embodiments, the ICS computing component hash information database 108 is contained in the vulnerability prediction server 110.

Example System Configuration

In one or more embodiments, the secure media exchange node 102 or the vulnerability prediction server 110, is embodied by one or more computing systems and include one or more components shown in circuitry 200 shown in FIG. 2. According to one or more embodiments, the circuitry 200 includes a processor 202, a memory 201, input/output circuitry 203, communications circuitry 205, vulnerability analysis circuitry 204 (for the vulnerability prediction server 110), file hash generation circuitry 206 (for the secure media exchange node 102), and/or rules engine circuitry 207 (for the secure media exchange node 102). In one or more embodiments, the circuitry 200 also include the ICS computing component hash information database 108. In one or more embodiments, the ICS computing component hash information database 108 is stored on the memory 201. The circuitry 200 is configured to execute one or more operations described herein. Although these components 110 and 201-207 are described with respect to functional limitations, it should be understood that the particular implementations necessarily include the use of particular hardware. It should also be understood that, in certain embodiments, certain of these components 110 and 201-207 include similar or common hardware. For example, in an embodiment, two sets of circuitry both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in one or more embodiments, software for configuring the hardware. For example, in one or more embodiments, "circuitry" includes processing circuitry, storage media, network interfaces, input/output devices, and the like. In one or more embodiments, other elements of the circuitry 200 provide or supplement the functionality of particular circuitry. For example, in one or more embodiments, the processor 202 provides processing functionality, the memory 201 provides storage functionality, the communications circuitry 205 provides network interface functionality, and the like.

In one or more embodiments, the processor 202 (and/or co-processor or any other processing circuitry assisting or otherwise associated with the processor) is in communication with the memory 201 via a bus for passing information among components of the apparatus. In one or more embodiments, the memory 201 is non-transitory and includes, for example, one or more volatile and/or non-volatile memories. In other words, in one or more embodiments, the memory 201 is an electronic storage device (e.g., a computer readable storage medium). In one or more embodiments, the memory 201 is configured to store information, data, content, applications, instructions, identifiers, requests, communications, or the like, for enabling the apparatus to carry out various functions in accordance with example embodiments of the present disclosure.

According to one or more embodiments, the memory 201 includes a non-volatile computer-readable storage medium such as a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. In one or more embodiments, such a non-volatile computer-readable storage medium also includes read-only memory (ROM), programmable read-only memory (PROM), erasable programmable read-only memory (EPROM), electrically erasable programmable read-only memory (EEPROM), flash memory (e.g., Serial, NAND, NOR, and/or the like), and/or the like. Further, in one or more embodiments, a non-volatile computer-readable storage medium also includes conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to one or more embodiments, the processor 202 includes one or more processing devices configured to perform independently. Additionally or alternatively, in one or more embodiments, the processor 202 includes one or more processors configured in tandem via a bus to enable independent execution of instructions, pipelining, and/or multithreading. It is to be appreciated that the use of the term "processing circuitry" is understood to include a single core processor, a multi-core processor, multiple processors internal to the apparatus, and/or remote or "cloud" processors.

In an example embodiment, the processor 202 is configured to execute instructions stored in the memory 201 or otherwise accessible to the processor. Alternatively, or additionally, the processor 202 is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively, as another example, when the processor 202 is embodied as an executor of software instructions, the instructions specifically configure the processor 202 to perform the algorithms and/or operations described herein when the instructions are executed.

In one or more embodiments, the circuitry 200 includes input/output circuitry 203 in communication with processor 202 to provide output to the user and, in one or more embodiments, to receive an indication of a user input. In one or more embodiments, the input/output circuitry 203 includes a user interface, a display, a web user interface, a mobile application, a kiosk, and/or the like. In one or more embodiments, the input/output circuitry 203 also includes a keyboard, a mouse, a joystick, a touch screen, touch areas, soft keys, a microphone, a speaker, and/or other input/output mechanisms. In one or more embodiments, the processor 202 and/or user interface circuitry comprising the processor 202 is configured to control one or more functions of one or more user interface elements through computer program instructions (e.g., software and/or firmware) stored on a memory (e.g., memory 201, and/or the like) accessible to the processor 202.

According to one or more embodiments, the communications circuitry 205 is a device or circuitry embodied in either hardware or a combination of hardware and software that is configured to receive and/or transmit data from/to a network and/or any other device, circuitry, or module in communication with the circuitry 200. In this regard, in one or more embodiments, the communications circuitry 205 includes, for example, a network interface for enabling communications with a wired or wireless communication network. For example, in one or more embodiments, the communications circuitry 205 includes one or more network interface cards, antennae, buses, switches, routers, modems, and supporting hardware and/or software, or any other device suitable for enabling communications via a network. Additionally or alternatively, in one or more embodiments, the communication interface 205 includes circuitry for interacting with the antenna(s) to cause transmission of signals via the antenna(s) or to handle receipt of signals received via the antenna(s).

The vulnerability analysis circuitry 204 includes hardware configured to generate a vulnerability analysis. In one or more embodiments, the vulnerability analysis circuitry 204 utilizes processing circuitry, such as the processor 202, to perform these actions. In one or more embodiments, the vulnerability analysis circuitry 204 sends and/or receives data from ICS computing component hash information database 108. In some implementations, the sent and/or received data includes file hashes, threat indicators, predictive indicators, or the like. It should also be appreciated that, in one or more embodiments, the vulnerability analysis circuitry 204 includes a separate processor, specially configured field programmable gate array (FPGA), or application specific interface circuit (ASIC).

According to one or more embodiments, the file hash generation circuitry 206 includes hardware configured to generate one or more file hashes of one or more industrial control files received. In one or more embodiments, the file hash generation circuitry 206 utilizes processing circuitry, such as the processor 202, to perform these actions. It should also be appreciated that, in one or more embodiments, the vulnerability analysis circuitry 204 includes a separate processor, specially configured FPGA or ASIC.

According to one or more embodiments, the rules engine circuitry 207 includes hardware configured to create and/or manage one or more rules and/or one or more policies for authentication of one or more peripheral devices communicatively coupled to the industrial control system 106. In one or more embodiments, the rules engine circuitry 207 utilizes processing circuitry, such as the processor 202, to perform these actions. It should also be appreciated that, in one or more embodiments, the rules engine circuitry 207 includes a separate processor, specially configured FPGA or ASIC.

As described above and as will be appreciated based on this disclosure, one or more embodiments of the present disclosure is configured as methods, mobile devices, backend network devices, and the like. Accordingly, one or more embodiments comprise various means including entirely of hardware or any combination of software and hardware. Furthermore, one or more embodiments take the form of a computer program product on at least one non-transitory computer-readable storage medium having computer-readable program instructions (e.g., computer software) embodied in the storage medium. According to one or more embodiments, any suitable computer-readable storage medium is utilized including, for example, non-transitory hard disks, CD-ROMs, flash memory, optical storage devices, or magnetic storage devices.

Example System Operations

Referring now to FIG. 3, a flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system. FIG. 3 and other flowcharts herein are for illustrative purposes and are not to be limiting unless otherwise stated herein. Unless otherwise noted, various operations discussed in FIG. 3 and other flowcharts may be used in the same or separate embodiments of the present disclosure.

In one or more embodiments, a secure media exchange node 102 receives one or more industrial control files associated with at least one of one or more ICS computing components in an industrial control system. In one or more embodiments, the secure media exchange node 102 uses the file hash generation circuitry 206 to generate one or more file hashes of the one or more industrial control files. Additionally, in one or more embodiments, the secure media exchange node 102 transmits a hash query that includes the one or more file hashes to the vulnerability prediction server 110. As shown in Block 300 of FIG. 3, the vulnerability prediction server 110 is configured to receive a hash query from a secure media exchange node 102.

The secure media exchange node 102 is configured to receive the industrial control files generated from the at least one of one or more ICS computing components in the industrial control system or receive industrial control files to be transmitted to the at least one of one or more ICS computing components in the industrial control system. In one or more embodiments, the industrial control system is a computing system that is not connected to the communication network 104, or any communication network that may connect to the Internet. In one or more embodiments, the one or more industrial control files are stored on a USB based storage device to be connected to an ICS computing component associated with the one or more industrial control files. For example, in one or more embodiments, the USB based storage device is connected to the secure media exchange node before the USB based storage device is connected to the ICS computing component to transmit the one or more industrial control files to the ICS computing component. In one or more embodiments, the USB based storage device stores one or more industrial control files generated by the ICS computing component and transmits the one or more industrial control files to the secure media exchange node via a USB. In one or more embodiments, the secure media exchange node uses the file hash generation circuitry 206 to generate the file hash.

As shown in Block 310 of FIG. 3, the vulnerability prediction server 110 is configured to query an ICS computing component hash information database 108 based on the hash query. In one or more embodiments, the ICS computing component hash information database 108 includes one or more databases, such as an ICS computing component threat intelligence database 108A and an ICS computing component vulnerability prediction database 108B. In one or more embodiments, the ICS computing component hash information database 108 stores one or more file hashes. In one or more embodiments, the one or more file hashes are each identified, in the ICS computing component hash information database 108, as a safe file hash, a file hash associated with a predictive indicator, or a security threat hash. In one or more embodiments, the one or more file hashes may be also associated with one or more ICS computing component identifiers, one or more predictive indicators, one or more threat indicators, or the like. In one or more embodiments, a file hash not identified in the ICS computing component hash information database 108 is considered to be a safe file hash.

According to one or more embodiments, the ICS computing component hash information database 108 is embodied as a data storage device such as a Network Attached Storage (NAS) device or devices, or as a separate database server or servers. The ICS computing component hash information database 108 includes file hashes of one or more industrial files and data associated with the file hashes. For example, in one or more embodiments, the ICS computing component hash information database 108 includes, without limitation, outdated file flags associated with the file hashes, updated timestamps associated with the file hashes, version numbers associated with the file hashes, predictive indicators associated with the file hashes, threat indicators associated with the file hashes, or the like. In one or more embodiments, the ICS computing component hash information database 108 includes an ICS computing component threat intelligence database 108A and/or an ICS computing component vulnerability prediction database 108B. In one or more embodiments, the ICS computing component vulnerability prediction database 108B includes one or more security threat hashes which are file hashes for industrial control files with known security threats. In one or more embodiments, the ICS computing component threat intelligence database 108A includes one or more predictive indicators associated with one or more file hashes. In one or more embodiments, the predictive indicators include one or more of: a version number associated with at least one of the one or more industrial control files, an updated timestamp associated with at least one of the one or more industrial control files, an outdated file flag representing that one or more files associated with at least one of the one or more industrial control files is not in the one or more industrial control files, and/or another form of indicator associated with the one or more file hashes.

As shown in Block 320 of FIG. 3, the vulnerability prediction server 110 is configured to compare the hash query with one or more hashes stored in the ICS computing component hash information database.

As shown in Block 330 of FIG. 3, the vulnerability prediction server 110 is configured to generate one or more ICS computing component information items associated with at least one of the one or more ICS computing components. In one or more embodiments, the vulnerability prediction server 110 generates the one or more ICS computing component information items associated with at least one of the one or more ICS computing components upon determining that the hash query matches at least one of the one or more hashes stored in the ICS computing component hash information database.

As shown in Block 340 of FIG. 3, the vulnerability prediction server 110 is configured to generate a vulnerability analysis regarding the industrial control system based on the one or more ICS computing component information items. In an embodiment, a vulnerability analysis is embodied as a file or data structure representing one or more vulnerabilities or potential vulnerabilities that are present in one or more ICS computing components. For example, in one or more embodiments, a vulnerability analysis includes data representative of one or more known security threats and/or data indicating that one or more ICS computing components are potentially vulnerable and require maintenance.

As shown in Block 350 of FIG. 3, the vulnerability prediction server 110 is configured to output the vulnerability analysis to a secure media exchange vulnerability portal associated with the secure media exchange node 102. A secure media exchange vulnerability portal is an interface configured to render data included in a vulnerability analysis. For example, in one or more embodiments, the secure media exchange vulnerability portal is configured as a web-based portal that is accessible to one or more computing entities. In one or more embodiments, the secure media exchange vulnerability portal is rendered on the secure media exchange node 102. In one or more embodiments, the interface includes a warning message associated with one or more security threats and/or a message indicating on-site maintenance is needed for the ICS.

Additional Example System Operations

Referring now to FIG. 4A, an additional flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system.

As shown in Block 400 of FIG. 4A, the vulnerability prediction server 110 is configured to query an ICS computing component threat intelligence database with a hash query, such as a hash query as discussed above, which may be received from a secure media exchange node 102. As previously described, the ICS computing component threat intelligence database is included as part of the ICS computing component hash information database and is configured to store at least one or more security threat hashes representing one or more security threats associated with one or more industrial control files. In one or more embodiments, the one or more security threats are security threats, such as backdoors, vulnerabilities, viruses, trojans, or the like. In one or more embodiments, information regarding the one or more security threats is stored in the ICS computing component threat intelligence database.

As shown in Block 410 of FIG. 4A, the vulnerability prediction server 110 is configured to determine that at least one file hash in the hash query matches at least one of the one or more security threat hashes. In one or more embodiments in which the vulnerability prediction server 110 does not determine that the hash query matches at least one of the one or more security threat hashes, the vulnerability prediction server 110 is configured to proceed with the workflow described later in conjunction with FIG. 4B.

As shown in Block 420 of FIG. 4A, the vulnerability prediction server 110 is configured to generate one or more threat indicators representing the one or more security threats as the one or more ICS computing component information items. In one or more embodiments, the information regarding the one or more security threats stored in the ICS computing component threat intelligence database is fetched by the vulnerability prediction server 110 and included in the one or more threat indicators. In one or more embodiments, a distinctive threat indicator is generated for each file hash that matches the security threat hashes.

Referring now to FIG. 4B, an additional flowchart is provided to illustrate operations that are executed by an example embodiment of an apparatus used to embody various components illustrated in FIG. 1, such as the vulnerability prediction server 110, for programmatically detecting vulnerability and predicting maintenance in an industrial control system.

As shown in Block 430 of FIG. 4B, the vulnerability prediction server 110 is configured to query the ICS computing component vulnerability prediction database with the hash query. As previously described, the ICS computing component vulnerability prediction database is part of the ICS component hash information database and includes one or more predictive indicators associated with one or more file hashes. In one or more embodiments, the predictive indicators include one or more of a version number associated with at least one of the one or more industrial control files, an updated timestamp associated with at least one of the one or more industrial control files, an outdated file flag representing that one or more files associated with at least one of the one or more industrial control files is not in the one or more industrial control files, a flag representing that the one or more industrial files that indicate maintenance, one or more industrial files that are associated with software tools related to maintenance, and/or another form of indicator associated with the one or more file hashes.

As shown in Block 440 of FIG. 4B, the vulnerability prediction server 110 is configured to receive the one or more predictive indicators from the ICS computing component vulnerability prediction database.

As shown in Block 450 of FIG. 4B, the vulnerability prediction server 110 is configured to generate the vulnerability analysis based on the one or more predictive indicators. In one or more embodiments, by way of example, the vulnerability analysis is generated by comparing the updated timestamp with a pre-defined timestamp representing a potentially vulnerable version. If the updated timestamp is earlier than the pre-defined timestamp, the vulnerability analysis is generated to indicate that the industrial file associated with the update timestamp is potentially vulnerable. In another example, the vulnerability analysis is generated by determining that the one or more file hashes associated with the industrial files received are associated with an outdated file flag because one or more files associated with at least one of the one or more industrial control files that are pre-defined to be associated with (e.g., because the one or more files should be present, along with the one or more industrial control files received, in a pre-defined non-vulnerable version) at least one of the one or more industrial control files are not in the one or more industrial control files.

In one or more embodiments, the vulnerability analysis is generated by comparing a version number associated with the one or more industrial control files with a pre-defined version number. If the version number associated with the one or more industrial control files indicates that the version of the one or more industrial control files is earlier than a version associated with the pre-defined version number, the vulnerability analysis indicates that the one or more industrial control files are potentially vulnerable. In one or more embodiments, the vulnerability analysis is generated by using a combination of one or more of the example methods described above. In one or more embodiments, the vulnerability analysis generated based on predictive indicators indicates that on-site maintenance is needed at the ICS.

Referring now to FIG. 5, an additional flowchart is provided to illustrate operations that are executed by an example embodiment of an apparatus used to embody various components illustrated in FIG. 1, such as the vulnerability prediction server 110, for programmatically building an ICS computing components model based on the one or more industrial files received.

As shown in Block 500 of FIG. 5, the vulnerability prediction server 110 is configured to query the ICS computing component hash information database based on the hash query to identify at least one component of the one or more ICS computing components.

As shown in Block 510 of FIG. 5, the vulnerability prediction server 110 is configured to store the identified component in an ICS computing components model associated with the ICS. In one or more embodiments, the ICS computing components model is generated based on one or more ICS system models that include information regarding one or more ICS computing components and association between different models of ICS computing components. In one or more embodiments, the one or more ICS system models are stored in the ICS computing component hash information database 108. For example, in an embodiment, an ICS system model indicates that an ICS computing component with a model number of 89114 by manufacturer ACME is determined to be associated with one or more ICS computing components of different model numbers by manufacturer ACME or a different manufacturer. In one or more embodiments, the one or more ICS system models are updated periodically based on the ICS computing components model.

Additional Example System Operations

Referring now to FIG. 6, an additional flowchart is provided to illustrate operations that are executed by an example embodiment of an apparatus used to embody various components illustrated in FIG. 1, such as the vulnerability prediction server 110, for programmatically creating rules and/or policies for authentication of peripheral devices in an industrial control system.

In one or more embodiments, the vulnerability prediction server 110 and/or the secure media exchange node 102 perform a rule creation mode and/or a rule authentication mode to facilitate authentication of peripheral devices in the industrial control system 106.

As shown in Block 600 of FIG. 6, the vulnerability prediction server 110 is configured to receive an indication of a peripheral device being communicatively coupled to an industrial control system (e.g., industrial control system 106), the indication comprising a device identifier that identifies the peripheral device. For example, in an embodiment, the vulnerability prediction server 110 is configured to receive an indication of the peripheral device being plugged into a USB port of the industrial control system. In another embodiment, the vulnerability prediction server 110 is configured to receive an indication of the peripheral device being communicatively coupled to the industrial control system via a wireless connection (e.g., a Bluetooth® connection). In another embodiment, the vulnerability prediction server 110 is configured to receive an indication of the peripheral device being communicatively coupled to the industrial control system via a radio-frequency identification (RFID) connection. In one or more embodiments, the receiving the indication provides one or more technical improvements such as, but not limited to, necessary interaction with respect to a computing device and/or extending functionality of a computing device. In one or more embodiments, the device identifier is a device identification (e.g., a unique device identification) for the peripheral device, a product identifier for the peripheral device, a vendor identifier for the peripheral device, a serial number for the peripheral device, a part number for the peripheral device, a model number for the peripheral device, and/or another identifier for the peripheral device. In a non-limiting example, the peripheral device is a USB device. According to one or more embodiments, the peripheral device is associated with a picture transfer protocol, a media transfer protocol and/or another type of protocol for connectivity control and/or data transfer.

As shown in Block 610 of FIG. 6, the vulnerability prediction server 110 is configured to determine if the indication is processed. For example, the vulnerability prediction server 110 is configured to determine whether the peripheral device is accurately identified. Additionally or alternatively, the vulnerability prediction server 110 is configured to determine whether one or more industrial control files, one or more device drivers, one or more industrial control system drivers, and/or one or more hash files are located to facilitate obtaining information with respect to the peripheral device. In one or more embodiments, the determining whether the indication is processed provides one or more technical improvements such as, but not limited to, extending functionality of a computing device and/or improving accuracy of data provided to a computing device.

As shown in Block 620 of FIG. 6, the vulnerability prediction server 110 is configured to obtain, based on the device identifier, device-level data for the peripheral device from one or more industrial control files. In one or more embodiments, the one or more industrial control files are associated with one or more industrial control drivers (e.g., one or more secure media exchange drivers) for an operating system of the secure media exchange node 102 associated with a rule service, a rule database and/or one or more rule settings. In one or more embodiments, in response to the peripheral device being communicatively coupled to the industrial control system, the one or more industrial control drivers notifies the rules engine circuitry 207 of the peripheral device being communicatively coupled to the industrial control system. In one or more embodiments, the vulnerability prediction server 110 is configured to perform one or more machine learning techniques to determine a device category classification for the peripheral device. In one or more embodiments, the vulnerability prediction server 110 is configured to query the peripheral device to determine a device category classification for the peripheral device. In one or more embodiments, the obtaining the device-level data provides one or more technical improvements such as, but not limited to, extending functionality of a computing device and/or improving accuracy of data provided to a computing device.

An example of the device-level data is illustrated in FIG. 7. For example, in one or more embodiments, device-level data 700 includes a vendor ID data 702, a product ID data 704, a device category data 706, a device subcategory data 708, action data 710, max count data 712, boot time data 714 and/or user group data 716. In one or more embodiments, the device-level data 700 is configurable based on data provided by the rules engine circuitry 207 and/or data provided by one or more users via a user interface. In one or more embodiments, the vendor ID data 702 is a vendor identifier (e.g., Vendor_ID) for the peripheral device, the product ID data 702 is a product identifier (e.g., Product_ID) for the peripheral device, the device category data 706 includes category data for the peripheral device, the device subcategory data 708 includes subcategory data for the peripheral device, the action data 710 includes one or more actions (e.g., accept, reject or initiate additional layer of authentication) for the peripheral device, the max count data 712 includes a maximum number of times a peripheral devices (e.g., max_count data) is able to connect to the industrial control system, the boot time data 714 includes an indication as to whether the action data 710 is an action for a boot time mode or a non-boot time mode for the industrial control system, and the user group data 716 includes a security identifier for a user associated with the peripheral device. In an example embodiment, the vendor ID data 702 corresponds to "413C" for the peripheral device, the product ID data 702 corresponds to "2107" for the peripheral device, the device category data 706 corresponds to "USB input device", the device subcategory data 708 corresponds to "keyboard", the action data 710 corresponds to "accept" access of the peripheral device to the industrial control system, the max count data 712 corresponds to "10", the boot time data 714 corresponds to "false", and the user group data 716 corresponds to "USER_1234."

As shown in Block 630 of FIG. 6, the vulnerability prediction server 110 is configured to define one or more authorization rules for the peripheral device based on the device-level data. In one or more embodiments, the vulnerability prediction server 110 is configured to define the one or more authorization rules based on device categorization data included in the device-level data. In one or more embodiments, the vulnerability prediction server 110 is configured to define the one or more authorization rules based on different modes (e.g., boot time vs non-boot time) of the industrial control system. In an embodiment, the vulnerability prediction server 110 is configured to define, based on the device-level data, an authorization rule that allows the peripheral device access to one or more portions of the industrial control system. In an embodiment, the vulnerability prediction server 110 is configured to define, based on the device-level data, an authorization rule that rejects access of the peripheral device access to one or more portions of the industrial control system. In an embodiment, the vulnerability prediction server 110 is configured to define, based on the device-level data, an authorization rule that initiates a conscious authorization (e.g., an additional layer of authentication) of the peripheral device to access to one or more portions of the industrial control system. In one or more embodiments, the defining the one or more authorization rules provides one or more technical improvements such as, but not limited to, extending functionality of a computing device (e.g., an industrial control system) and/or improving accuracy of data for a computing device (e.g., an industrial control system).

An example of the device categorization data is illustrated in FIG. 8. For example, in one or more embodiments, device categorization data 800 includes device category data 802 and device subcategory data 804. In one or more embodiments, the device category data 802 corresponds to the device category data 706 included in the device-level data 700 and the device subcategory data 804 corresponds to the device subcategory data 708 included in the device-level data 700. In an example embodiment, the device category data 802 corresponds to "USB mass storage device" and the device subcategory data 804 corresponds to "flash drive," "supper floppy," "CD/DVD," "tape," or "other/vendor defined." In another example embodiment, the device category data 802 corresponds to "USB input device" and the device subcategory data 804 corresponds to "keyboard," "keypad," "pointer," "mouse," "consumer audio control," "system control," "touch pad," "touch screen," or "vendor defined." In one or more embodiments, a peripheral device can include device category data 802 but not device subcategory data 804. For example, in an example, embodiment, device category data 802 corresponds to "USB Wireless" and the device subcategory data 804 corresponds to "none."

In one or more embodiments, the vulnerability prediction server 110 is configured to create a rule database hash file with the device-level data and/or the one or more authorization rules. In one or more embodiments, the rule database hash file is stored in the ICS computing component hash information database 108. In one or more embodiments, the creating the rule database hash file provides one or more technical improvements such as, but not limited to, extending functionality of a computing device and/or improving accuracy of data provided to a computing device.

In one or more embodiments, the vulnerability prediction server 110 is configured to store the rule database hash file in a database for a secure media exchange platform associated with the industrial control system. In one or more embodiments, the storing the rule database hash file provides one or more technical improvements such as, but not limited to, extending functionality of a computing device and/or improving accuracy of data provided to a computing device.

In one or more embodiments, the vulnerability prediction server 110 is configured to query the peripheral device to obtain device categorization data for the peripheral device. In one or more embodiments, the querying the peripheral device provides one or more technical improvements such as, but not limited to, extending functionality of a computing device and/or improving accuracy of data provided to a computing device.

In one or more embodiments, the vulnerability prediction server 110 is configured to obtain the device-level data from a simulation performed with respect to system operations system for the industrial control system. For instance, in one or more embodiments, the vulnerability prediction server 110 is configured to employ one or more simulations to predict how the peripheral device will employed by the industrial control system. In one or more embodiments, the vulnerability prediction server 110 is additionally or alternatively configured to determine if and/or when the peripheral device is allowed to connect to the industrial control system based on the simulation performed with respect to system operations system for the industrial control system. In one or more embodiments, the obtaining the device-level data from the simulation provides one or more technical improvements such as, but not limited to, extending functionality of a computing device and/or improving accuracy of data provided to a computing device.

In one or more embodiments, in response to receiving another indication of the peripheral device being communicatively coupled to the industrial control system, the vulnerability prediction server 110 is configured to initiate a rule authentication mode to determine whether to authorize the peripheral device to access the industrial control system.

For example, when the peripheral device is connected to the secure media exchange node 102 via a future connection, the rule database hash file can be employed to determine an authorization result (e.g., allow, reject, or initiate additional layer of authentication) for the peripheral device. In one or more embodiments, the rule authentication mode provides the authorization results and device categorization data to the one or more industrial control system drivers to facilitate authorization of the peripheral device. In one or more embodiments, the initiating the rule authentication mode provides one or more technical improvements such as, but not limited to, extending functionality of a computing device, improving accuracy of data provided to a computing device, and/or necessary interaction with respect to a computing device.

In one or more embodiments, in response to receiving another indication of the peripheral device being communicatively coupled to the industrial control system, the vulnerability prediction server 110 is configured to generate a notification for an additional layer of authentication provided by a user. In an embodiment, the additional layer of authentication is associated with an authorization code. In another embodiment, the additional layer of authentication is associated with a digital key exchange. In another embodiment, the additional layer of authentication is associated with a security token. In another embodiment, the additional layer of authentication is associated with a facial recognition process. In one or more embodiments, the additional layer of authentication obtains a list of security identifiers that are allowed to authorize the peripheral device. In one or more embodiments, the generating the notification provides one or more technical improvements such as, but not limited to, extending functionality of a computing device, improving accuracy of data provided to a computing device, and/or necessary interaction with respect to a computing device.

An example of the notification for the additional layer of authentication is illustrated in FIG. 9. For example, in one or more embodiments, a notification 900 includes device-level data 902, device capability data 904, an authorization code 906, and/or an input data field 908. In an example embodiment, the device-level data 902 includes data such as a vendor ID (e.g., 413C), a product ID (e.g., 2107), a manufacturer (e.g., Manufacturer_A), a product description (e.g., USB entry keyboard, USB input device, etc.). Furthermore, in the example embodiment, the device capability data 904 includes one or more capabilities (e.g., input, keyboard, etc.) for the peripheral device. In the example embodiment, the authorization code 906 is an authorization code (e.g., "247") for a user to input into the input data field 908. In one or more embodiments, the notification 900 is configured for rendering via a user interface (e.g., an electronic user interface, a graphical user interface, etc.) of a computing device (e.g., the secure media exchange node 102).

While this specification contains many specific implementation details, these should not be construed as limitations on the scope of any disclosures or of what may be claimed, but rather as descriptions of features specific to particular embodiments of particular disclosures. In one or more embodiments, certain features that are described herein in the context of separate embodiments are also implemented in combination in a single embodiment. Conversely, various features that are described in the context of a single embodiment are also implemented in multiple embodiments separately or in any suitable subcombination. Moreover, although features may be described above as acting in certain combinations and even initially claimed as such, in one or more embodiments, one or more features from a claimed combination are excised from the combination, and the claimed combination is directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing is advantageous. Moreover, the separation of various system components in the embodiments described above should not be understood as requiring such separation in all embodiments, and it should be understood that the described program components and systems are generally integrated together in a single software product or packaged into multiple software products.

Thus, particular embodiments of the subject matter have been described. Other embodiments are within the scope of the following claims. In some cases, the actions recited in the claims are performed in a different order and still achieve desirable results. In addition, the processes depicted in the accompanying figures do not necessarily require the particular order shown, or sequential order, to achieve desirable results. In certain implementations, multitasking and parallel processing are advantageous.

As described above, FIGS. 3, 4A, 4B, 5 and 6 illustrate flowcharts of apparatuses and methods according to example embodiments of the invention. It will be understood that each block of the flowcharts, and combinations of blocks in the flowcharts, are implemented, according to one or more embodiments, by various means, such as hardware, firmware, processor, circuitry, and/or other devices associated with execution of software including one or more computer program instructions. For example, in one or more embodiments, one or more of the procedures described above are embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. In one or more embodiments, these computer program instructions are also stored in a computer-readable memory that direct a computer or other programmable apparatus to function in a particular manner, such that the instructions stored in the computer-readable memory produce an article of manufacture the execution of which implements the function specified in the flowcharts blocks. In one or more embodiments, the computer program instructions are also loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that, in one or more embodiments, one or more blocks of the flowcharts, and combinations of blocks in the flowcharts, are implemented by special purpose hardware-based computer systems which perform the specified functions, or combinations of special purpose hardware and computer instructions.

In one or more embodiments, certain ones of the operations above are modified or further amplified. Furthermore, in one or more embodiments, additional optional operations are included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
    at a device with one or more processors and a memory:
        receiving an indication of a peripheral device, in response to the peripheral device being communicatively coupled to an industrial control system, wherein the indication comprises: a device identifier that identifies the peripheral device;
        obtaining, based on the device identifier, device-level data for the peripheral device from one or more industrial control files; and
        defining one or more authorization rules for the peripheral device based on the device-level data, wherein at least one authorization rule of the one or more authorization rules initiates an authentication process for the peripheral device, wherein the authentication process comprises:
            rendering, on a user interface of the device, an authorization code;
            inputting, by a user, via the user interface, the authorization code to authorize the peripheral device;
            authorizing the peripheral device to access at least one portion of the industrial control system in response to inputting the authorization code; and
            accessing, by the peripheral device, the at least one portion of the industrial control system in response to authorizing the peripheral device, wherein the at least one portion of the industrial control system is inaccessible to the peripheral device before the authentication process.

2. The method of claim 1, the defining one or more authorization rules comprising defining the one or more authorization rules based on device categorization data indicative of category data for the peripheral device included in the device-level data wherein the device-level data comprises at least one of: a vendor identification, a product identification, a device subcategory, action data indicative of one or more actions for the peripheral device, count data indicative of a count, the peripheral device is able to connect to the industrial control system, boot time data indicating if at least one action of the action data is for a boot time mode or a non-boot time mode for the industrial control system, and user group data indicative of a security identifier for the user associated with the peripheral device.

3. The method of claim 1, the defining one or more authorization rules comprising defining the one or more authorization rules based on at least one mode of the industrial control system, wherein the at least one mode is indicative of: a boot time mode and a non-boot time mode.

4. The method of claim 1, further comprising:
    creating a rule database hash file with the device-level data and the one or more authorization rules; and
    storing the rule database hash file in a database for a secure media exchange platform associated with the industrial control system.

5. The method of claim 1, further comprising:
    querying the peripheral device to obtain device categorization data for the peripheral device; and
    obtaining the device-level data from a simulation performed with respect to system operations system for the industrial control system.

6. The method of claim 1, further comprising:
    rendering, on the user interface, at least one of: the device-level data, device capability data, and an input data field, wherein the device capability data includes one or more capabilities of the peripheral device, and wherein the input data field allows the user to input the authorization code.

7. The method of claim 1, wherein the defining one or more authorization rules further comprises defining at least one rule indicative of:
    an access for the peripheral device to one or more portions of the industrial control system; and
    a rejection of access for the peripheral device to the one or more portions of the industrial control system.

8. An apparatus comprising at least one processor and at least one non-transitory memory including computer program code instructions, the computer program code instructions configured to, when executed, cause the apparatus to:
    receive an indication of a peripheral device, in response to the peripheral device being communicatively coupled to an industrial control system, wherein the indication comprises: a device identifier that identifies the peripheral device;
    obtain, based on the device identifier, device-level data for the peripheral device from one or more industrial control files; and
    define one or more authorization rules for the peripheral device based on the device-level data, wherein at least one authorization rule of the one or more authorization rules initiates an authentication process for the peripheral device, wherein the authentication process comprises:
        rendering, on a user interface of the device, an authorization code;
        inputting, by a user, via the user interface, the authorization code to authorize the peripheral device;
        authorizing the peripheral device to access at least one portion of the industrial control system in response to inputting the authorization code; and
        accessing, by the peripheral device, the at least one portion of the industrial control system in response to authorizing the peripheral device, wherein the at least one portion of the industrial control system is inaccessible to the peripheral device before the authentication process.

9. The apparatus of claim 8, the one or more authorization rules defined based on device categorization data indicative of category data for the peripheral device included in the device-level data, wherein the device-level data comprises at least one of: a vendor identification, a product identification, a device subcategory, action data indicative of one or more actions for the peripheral device, count data indicative of a count, the peripheral device is able to connect to the industrial control system, boot time data indicating if at least one action of the action data is for a boot time mode or a non-boot time mode for the industrial control system, and user group data indicative of a security identifier for the user associated with the peripheral device.

10. The apparatus of claim 8, the one or more authorization rules defined based on different at least one mode of the industrial control system, wherein the at least one mode is indicative of: a boot time mode and a non-boot time mode.

11. The apparatus of claim 8, the computer program code instructions further configured to, when executed, cause the apparatus to:
create a rule database hash file with the device-level data and the one or more authorization rules.

12. The apparatus of claim 11, the computer program code instructions further configured to, when executed, cause the apparatus to:
store the rule database hash file in a database for a secure media exchange platform associated with the industrial control system.

13. The apparatus of claim 8, the computer program code instructions further configured to, when executed, cause the apparatus to:
query the peripheral device to obtain device categorization data for the peripheral device.

14. The apparatus of claim 8, the computer program code instructions further configured to, when executed, cause the apparatus to:
obtain the device-level data from a simulation performed with respect to system operations system for the industrial control system.

15. The apparatus of claim 8, wherein the user interface is further configured to render, at least one of: the device-level data, device capability data, and an input data field, wherein the device capability data includes one or more capabilities of the peripheral device, and wherein the input data field allows the user to input the authorization code.

16. The apparatus of claim 8, wherein the one or more authorization rules comprises at least one rule indicative of:
an access for the peripheral device to one or more portions of the industrial control system; and
a rejection of access for the peripheral device to the one or more portions of the industrial control system.

17. A non-transitory computer-readable storage medium comprising one or more programs for execution by one or more processors of a device, the one or more programs including instructions which, when executed by the one or more processors, cause the device to:
receive an indication of a peripheral device, in response to the peripheral device being communicatively coupled to an industrial control system, wherein the indication comprises: a device identifier that identifies the peripheral device;
obtain, based on the device identifier, device-level data for the peripheral device from one or more industrial control files; and
define one or more authorization rules for the peripheral device based on the device-level data, wherein at least one authorization rule of the one or more authorization rules initiates an authentication process for the peripheral device, wherein the authentication process comprises:
rendering, on a user interface of the device, an authorization code;
inputting, by a user, via the user interface, the authorization code to authorize the peripheral device;
authorizing the peripheral device to access at least one portion of the industrial control system in response to inputting the authorization code; and
accessing, by the peripheral device, the at least one portion of the industrial control system in response to authorizing the peripheral device, wherein the at least one portion of the industrial control system is inaccessible to the peripheral device before the authentication process.

18. The non-transitory computer-readable storage medium of claim 17, the one or more authorization rules defined based on device categorization data indicative of category data for the peripheral device included in the device-level data, wherein the device-level data comprises at least one of: a vendor identification, a product identification, a device subcategory, action data indicative of one or more actions for the peripheral device, count data indicative of a count, the peripheral device is able to connect to the industrial control system, boot time data indicating if at least one action of the action data is for a boot time mode or a non-boot time mode for the industrial control system, and user group data indicative of a security identifier for the user associated with the peripheral device.

19. The non-transitory computer-readable storage medium of claim 17, wherein the one or more authorization rules further comprises at least one rule indicative of:
an access for the peripheral device to one or more portions of the industrial control system; and
a rejection of access for the peripheral device to the one or more portions of the industrial control system.

20. The non-transitory computer-readable storage medium of claim 17, wherein the one or more processors is further configured to:
create a rule database hash file with the device-level data and the one or more authorization rules; and
store the rule database hash file in a database for a secure media exchange platform associated with the industrial control system.

* * * * *